United States Patent [19]

Holzapfel et al.

[11] Patent Number: 5,804,887
[45] Date of Patent: Sep. 8, 1998

[54] SAFETY DEVICE FOR A VEHICLE WITH A REMOVABLE SEAT, ESPECIALLY A PASSENGER SEAT

[75] Inventors: Bernhard Holzapfel, Remshalden; Michael Meyer, Sindelfingen; Frank Zerrweck, Stuttgart, all of Germany

[73] Assignee: Mercedes-Benz AG, Stuttgart, Germany

[21] Appl. No.: 824,014

[22] Filed: Mar. 21, 1997

[30] Foreign Application Priority Data

Apr. 17, 1996 [DE] Germany .................. 196 15 321.2

[51] Int. Cl.⁶ .................................................. B60R 21/32
[52] U.S. Cl. .................. 307/10.1; 180/282; 280/735; 340/426
[58] Field of Search .................. 307/9.1, 10.1, 307/121; 280/734, 735; 180/271, 273, 282; 340/436, 438, 669; 701/36, 45

[56] References Cited

U.S. PATENT DOCUMENTS

| | | |
|---|---|---|
| 4,796,013 | 1/1989 | Yasuda et al. . |
| 5,454,591 | 10/1995 | Mazur et al. . |
| 5,468,014 | 11/1995 | Gimbel et al. . |
| 5,474,327 | 12/1995 | Schousek . |
| 5,515,933 | 5/1996 | Meyer et al. ........................ 280/735 |
| 5,528,698 | 6/1996 | Kamei et al. . |
| 5,570,903 | 11/1996 | Meister et al. . |
| 5,605,348 | 2/1997 | Blackburn et al. . |
| 5,626,359 | 5/1997 | Steffens, Jr. et al. .................. 280/735 |
| 5,678,854 | 10/1997 | Meister et al. ....................... 180/273 |
| 5,683,103 | 11/1997 | Blackburn et al. ................... 280/735 |
| 5,690,356 | 11/1997 | Lane, Jr. ............................... 280/735 |

FOREIGN PATENT DOCUMENTS

| | | |
|---|---|---|
| 0 650 869 | 5/1995 | European Pat. Off. . |
| 0691244A3 | 1/1996 | European Pat. Off. . |
| 4426677A1 | 2/1995 | Germany . |
| 4409971C2 | 9/1995 | Germany . |
| WO 92/20547 | 11/1992 | WIPO . |
| WO94/22693 | 10/1994 | WIPO . |
| WO95/02526 | 1/1995 | WIPO . |

OTHER PUBLICATIONS

Donald Reed, "Reinventing Government", *Automotive Engineering*, p. 23, Nov. 1993.
Donald Reed, "Executive Branch Activity", *Automotive Engineerig*, p. 84, Jul. 1993.
Society of Automotive Engineers, Inc., "Child Occupant Protection", *Child Occupant Protection Symposium,* San Antonio, Texas, Nov. 7–8, 1993, including Table of Contents, and articles by Thomas Turbell et al., *ECE Regulation 44—An Update on the Current Revision*, pp. 29–33; Thomas Turbell et al., *ISOFIX—A New Concept of Installing Child Restraints in Cars*, pp. 35–41; and Kathleen Weber, *Child Restraint and Airbag Interaction: Problem and Progress*, pp. 121–126.

(List continued on next page.)

*Primary Examiner*—Richard T. Elms
*Attorney, Agent, or Firm*—Evenson, McKeown, Edwards & Lenahan, P.L.L.C.

[57] ABSTRACT

A safety device is provided for a vehicle with a removable seat, especially a passenger seat, with an occupant restraint device associated with the seat. In addition, a seat occupation detection device located in the seat is provided that detects various states of seat occupation, especially by a person or by a child seat, and delivers a corresponding seat occupation status signal through a signal interface to a triggering control device located in the vehicle. The triggering control device takes the seat occupation status into account in delivering the triggering signal, especially to determine the scope of triggering of the restraint device. A seat installation detection device is provided that detects the proper installation of the seat and delivers a corresponding seat installation status signal to the triggering control device. The status signal permits the triggering control device, through a logical link with another status signal that indicates the correct signal transmission at the signal interface, to detect the actual presence or absence of the seat as well as a variety of defective states and to adjust accordingly the delivery of the triggering signal emitted in the case of a serious accident.

23 Claims, 1 Drawing Sheet

OTHER PUBLICATIONS

"Focus on . . . Passive Safety", *Automotive Engineer*, pp. 42–54, Oct./Nov. 1996.

Thomas Turbell, "Are Air Bags Compatible with Child Restraint Systems and Roadside Safety Features", *13th International Technical Conference on Experimental Safety Vehicles, Section 3:* Technical Sessions, pp. 1095–1098.

Donald Reed, "Air bag/Rear-facing Child Seat Incompatibility", *Automotive Engineering*, p. 51, Dec. 1994.

Search Report Sep. 15, 1997 EPX.

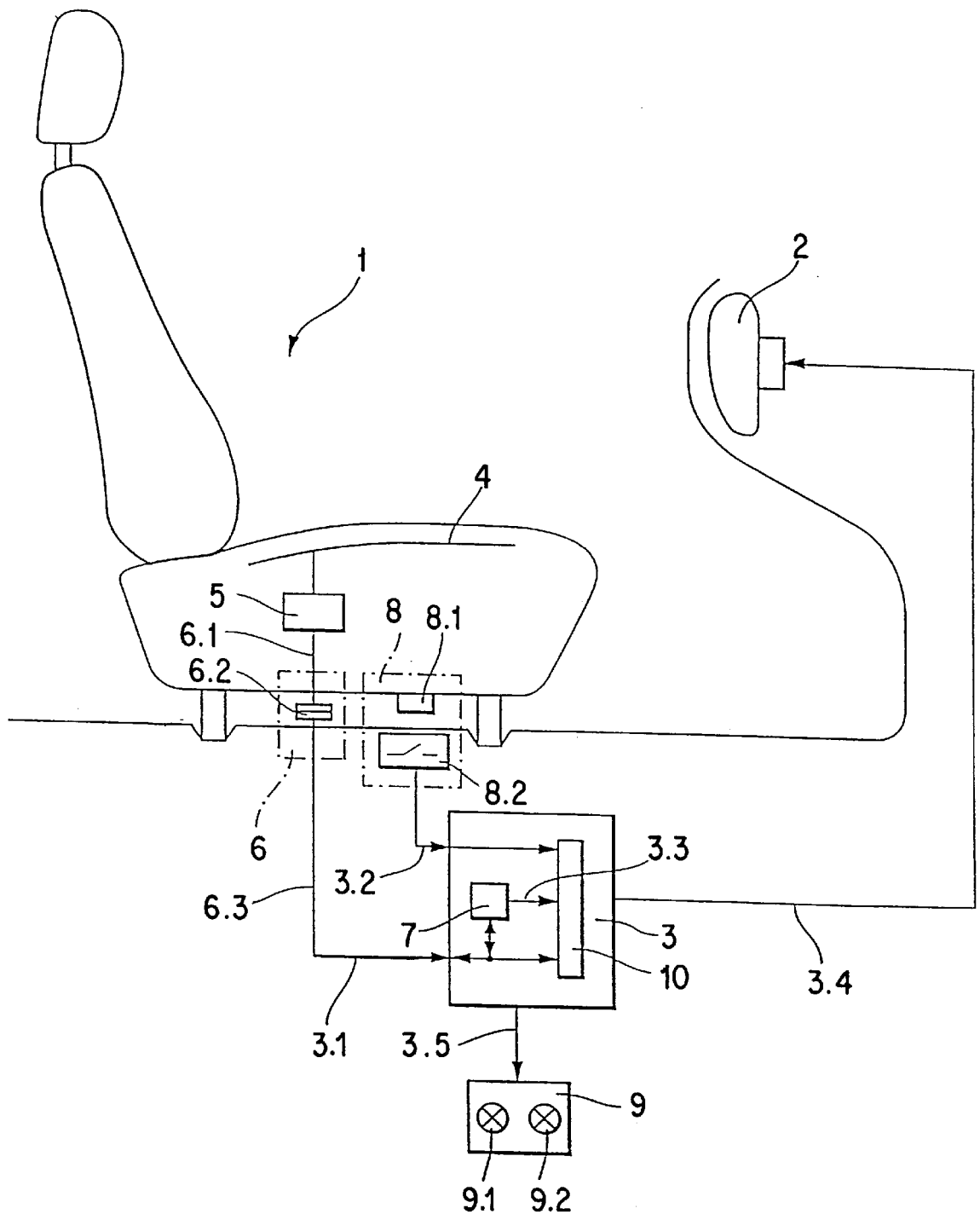

SAFETY DEVICE FOR A VEHICLE WITH A REMOVABLE SEAT, ESPECIALLY A PASSENGER SEAT

BACKGROUND AND SUMMARY OF THE INVENTION

This application claims the priority of German application number 196 15 321.2-22 filed on Apr. 17, 1996 the disclosure of which is expressly incorporated by reference herein.

The invention relates to a safety device for a vehicle with a removable seat.

Safety devices with a passenger restraint device associated with the seat, which device comprises at least an airbag which changes to a restraint position that protects the occupant in the event of a serious accident, are well known and are installed routinely in vehicles. The restraint device can be designed to have a number of components and can comprise a side bag and a belt tightener in addition to an airbag.

In order to prevent the passenger airbag from being triggered as a result of an accident when the passenger seat is not occupied, it is also known to detect the seat occupation status by means of a seat occupation detection device integrated into the seat cushion and to feed a corresponding signal to the triggering control device. If a signal is supplied to the triggering control device, indicating that a seat is unoccupied, triggering of the restraint device including all the components, will be suppressed if an accident occurs.

It is also known from German Patent Document DE 44 09 971 C2 to expand seat occupation detection by a form of child seat detection that determines whether a child seat, especially a backward-facing child seat (Reboard seat), is in the passenger seat. If this is the case, triggering of an airbag is undesirable since optimum protective action by the airbag is not guaranteed and the risk of injury by the airbag as it deploys cannot be ruled out. Therefore seat occupation detection combined with child seat detection produces a completely different seat occupation status signal that differs depending on whether the seat is occupied by a person or by a child seat. Additional forms of differentiation for the seat occupation status signal are also known, for example depending on the type of child seat or whether an occupant has put on his seat belt or not. The latter is interrogated by a switch integrated into the belt buckle.

The triggering control device can take account of a seat occupation status presented to it in different ways. For example, the triggering threshold and triggering time can be influenced depending on whether the occupant is belted in or not. However, as has already been mentioned, triggering can be suppressed completely if the seat is unoccupied or is occupied by a child seat. In addition, in a multicomponent restraint system that comprises an airbag, side bag, and belt tightener for example, triggering that is differentiated in terms of its scope can also take place, for example in such fashion that only the belt tightener is triggered. This assumes that correspondingly differentiated triggering signals can be supplied from the triggering control device to the restraint device.

In vehicles with removable seats, especially passenger seats that are so designed that they are especially simple to remove in order to provide cargo space as required, there is a problem involving connection of the seat occupation detection system, including child seat detection and the belt buckle switch, as well as the seat heater with the vehicle's electrical system. In particular, assurance must be provided that the restraint device is deactivated when the seat is removed, so that in the event of an accident unnecessary triggering that could even cause damage does not take place. Assurance must also be provided that when the seat is reinstalled in the vehicle, the connections for seat occupation recognition are made reliably. Otherwise, the triggering control device would be in the same position regarding its system check as if there were no seat, so that triggering of the restraint device would be suppressed even if an occupant were in the seat.

An electrical plug-in connection would be possible that would be connected or disconnected, automatically by the relative motion of the seat as the seat was installed or removed. Mounting the plug-in connection in the vicinity of the vehicle floor however always involves problems of contamination and dampness especially if, after the seat is removed, the floor which is then clear is used for carrying dirty objects such as bicycles or skis.

The embodiment according to the invention takes its departure from an electrical plug-in connection located in the lateral area of the seat, for example at the center tower or B pillar, as a signal interface by means of which the seat occupation detection device in the seat is connectable to the electrical system of the vehicle. Because the adjustment area of the seat lengthwise of the vehicle must be covered, the plug-in connection must be made on at least one side by a flexible cable (pigtail). This poses the danger that, the individual involved will forget to connect the plug-in connection as required during replacement of a seat that has been removed previously.

Regardless of how the signal interface between the seat occupation detection device and the triggering control device on the vehicle are made, the signal interface combined with facilitated ability to install and remove the seat poses new risks for the reliability of the safety device in the vehicle.

Therefore, the invention concerns a safety device for a vehicle with a removable passenger seat of the type comprising an occupant restraint device associated with said seat, said restraint device comprising at least one airbag and being triggerable in the event of a serious accident by a triggering signal from a triggering control device so that the restraint device assumes a restraint position that protects the occupant; a seat occupation detection device located in the seat that detects a variable seat occupation status, especially occupation by a person or a child seat, and delivers a corresponding seat occupation status signal through a signal interface to the triggering control device located in the vehicle, which takes the seat occupation status into account in issuing the triggering signal, especially in order to determine the scope of triggering of the restraint device. A goal of the invention to is to provide measures with such a safety device such that undesired triggering of the restraint device is always prevented when the seat has been removed but the reliability of the occupant protection offered by the safety device is not adversely impacted by the facilitated ability to install and remove the seat, especially as a result of inattention during replacement.

This goal is achieved according to preferred embodiments of the invention by providing such a safety device, wherein a seat installation detection device is provided that detects proper installation of the seat and delivers a corresponding seat installation status signal, wherein an interface interrogation unit is provided that checks the transmission capability of at least a signal interface and delivers a corresponding interface status signal, and wherein a triggering control device is configured to take into account the status signals for seat occupation, interface, and seat installation in such fashion that the scope of the triggering of the restraint device is adapted to the conditions characterized by the status signals.

In the device according to the invention, in contrast to the prior art, a seat installation detection device is provided that detects the proper installation of the seat and delivers a corresponding seat installation status signal to the triggering control device. This status signal allows the triggering control device, through logical linkage with another status signal that indicates correct signal transmission to the signal interface, to detect the actual presence or absence of the seat as well as a variety of error states and to adjust accordingly the delivery of the triggering signal that is issued in the case of a serious accident. With this adjustment, full or partial triggering of the restraint device can be suppressed or allowed.

Further advantages are provided in preferred embodiments of the invention by providing that the triggering of the restraint device is fully suppressed only when the seat is removed and the signal path to the signal interface has also been interrupted. The additional determination as to whether the seat has been installed or not increases safety and reduces sources of error.

If the seat has in fact been installed but the signal interface is not transmitting any signals, this error state can be detected, minimum protection provided, and the driver warned. In a safety device according to the prior art, if the triggering device assumed a state in which triggering of the restraint device was completely suppressed, the passengers would have no knowledge of this and would rely on the protective action of the safety device. The seat installation detection according to the invention constitutes a redundant path that permits checking the signal interface.

If the signal interface is set to transmit signals but seat occupation detection indicates that no seat is present, it may be concluded that seat installation has been defective, or that seat installation detection is defective, corresponding minimum protection can be provided and the driver warned.

Other objects, advantages and novel features of the present invention will become apparent from the following detailed description of the invention when considered in conjunction with the accompanying drawings.

BRIEF DESCRIPTION OF THE DRAWINGS

The single drawing FIGURE schematically depicts a vehicle passenger seat and safety device system constructed according to preferred embodiments of the invention.

DETAILED DESCRIPTION OF THE DRAWINGS

The single FIGURE shows a passenger seat 1 and a restraint device associated with passenger seat 1, said restraint device being formed by an airbag 2, which generally can also include other components such as belt tighteners or side bags. In a manner known of itself, airbag 2 is controlled by a triggering control device 3 which, when a serious accident occurs, delivers a triggering signal 3.4 to airbag 2. In addition, in a manner known of itself, a seat occupation sensor 4 is provided that is evaluated by an electronic evaluation circuit 5 in the seat and together with the latter forms a seat occupation detection device 4, 5.

In the simplest design, seat occupation detection device 4, 5 merely detects whether seat 1 is occupied (or not) and delivers a corresponding seat occupation status signal 3.1 to triggering control device 3. In another embodiment however a differentiated form of detection can be provided in which a distinction is made as to whether an occupant in seat 1 has put on his belt (or not) or whether seat 1 is occupied by a child seat, in which case triggering of airbag 2 must be completely suppressed. A correspondingly differentiated seat occupation status signal 3.1 is delivered to triggering control device 3.

Seat occupation status signal 3.1 is delivered to triggering control device 3 over a signal path that passes through signal interface 6. Signal interface 6 must firstly permit the absolutely necessary (when the seat is removed) separation of signal lead 6.1 in the seat from signal lead 6.3 on the vehicle side and secondly, when the seat is installed, guarantee reliable signal transmission. In the simplest case, signal interface 6 is formed by a plug-in connection 6.2 that must be released and connected manually.

In addition, interface integration unit 7 is provided, integrated into triggering control device 3, that checks the transmission capability of at least signal interface 6 and delivers a corresponding interface status signal 3.3. A check of entire signal path 6, 6.1, 6.3, or parts thereof that include signal interface 6 is also possible. When signal interface 6 is formed by an electrical plug-in connection 6.2, a determination is made as to whether the required coupling of plug-in connection 6.2 has been performed. This can be accomplished by means of an electrical continuity test of signal path 6.1, 6.2, 6.3, with a state being detected that is characteristic for the connection of signal lead 6 to evaluation electronics 5 in the seat itself, for example a specific electrical resistance of the connection. This can also be located in the half of plug-in connection 6.2 in the seat or in the half in the vehicle in order to limit the detection location to plug-in connection 6.2.

In addition, a seat installation detection device 8 is provided that detects the proper installation of seat 1 and delivers a corresponding seat installation status signal 3.2 to triggering control device 3. Seat installation detection device 8 is preferably made in the form of an end position switch that is actuated and connected to a certain potential when, with seat 1 installed, the latter or a mechanical seat locking part reaches a prescribed end position. The latter arrangement has the advantage that it is only when seat 1 has not only been installed but locked as well that the seat is recognized as having been installed. The switch can be in the form of a mechanical switch that is actuated during installation by a relative movement of the seat or the locking part. Alternatively, as shown in the FIGURE, the switch can be formed by a reed switch 8.2 located in the floor area of the vehicle, said reed switch being actuated by permanent magnet 8.1 located on the removable seat. Depending on which end position is to be detected, the permanent magnet is located on the seat frame or on a locking part. A reed switch has the advantage that encapsulating the switch eliminates adverse effects on function as a result of dirt or moisture. When special reed switches are used whose contacts are closed by the completion of the magnetic field lines by a metal part, permanent magnet 8.1 on removable seat 1 can be eliminated.

In addition, a warning device 9 controlled by triggering control device 3 with warning signals 3.5 is provided that informs the driver of the vehicle about defective states of the safety device. The warning can be given acoustically, by speech output for example, or optically by warning lights on the dashboard of the vehicle. In the embodiment shown, two warning lights 9.1, 9.2 are provided that are wired so that they do not glow during normal error-free operation.

Triggering control device 3 evaluates status signals 3.1, 3.2, and 3.3 for seat occupation, seat installation, and the interface in such fashion that they at least help to determine the extent to which triggering of the restraint device is allowed. The scope of triggering is then adapted to the condition characterized by status signals 3.1, 3.2, and 3.3. This occurs as follows: a first triggering decision reaches triggering control device 3 in known fashion by taking recorded acceleration values into account, involving in this case the seat occupation status, especially the result of a belt buckle interrogation, to influence triggering thresholds for example. At the same time, decisions are made continuously in logic unit 10 depending on status signals 3.1, 3.2, and 3.3 as to what scope of triggering of the restraint device is to be permitted. Thus triggering of the restraint device to its fullest extent or to only a partial extent, especially the belt tightener and the side bag and not including front airbag 2, can be permitted. The latter triggering scope is compatible with seat occupation by a child seat and can be permitted for this type of seat occupation. Specifically, logic unit 10 reaches its decisions as follows:

When seat installation status signal 3.2 indicates proper installation while interface status signal 3.3 indicates that signal interface 6 is capable of transmission, triggering according to available seat occupation status signal 3.1 is permitted as before. This state corresponds to the normal state with the seat installed correctly. It is advantageous in this regard if a reduced scope of triggering caused by occupation of the seat by a child seat is indicated by means of second warning light 9.2 glowing continuously.

If seat installation status signal 3.2 indicates an incorrect installation while interface status signal 3.3 indicates that the signal interface is incapable of transmission, no triggering will be permitted. This state corresponds to the normal state with the seat removed, and therefore there is no warning signal.

When seat installation status signal 3.2 indicates an incorrect installation while interface status signal 3.3 indicates that signal interface 6 is capable of transmission, triggering according to available seat occupation status signal 3.1 is permitted. This corresponds to an error state in which either seat 1 has been improperly installed or seat installation detection device 8 is defective. In the latter case, triggering control device 3 emits a warning signal 3.5 to alert the driver to a defect. In the embodiment, this warning is in the form of a continuous glowing of first warning light 9.1.

If seat installation status signal 3.2 indicates a correct installation while interface status signal 3.3 indicates that signal interface 6 is incapable of transmission, triggering of the restraint device is permitted but to a limited degree. In this defective state, seat 1 has in fact been installed correctly but signal interface 6 is defective, for example because electrical plug-in connection 6.2 was not assembled correctly. Triggering device 3 therefore does not have reliable information about the seat occupation status. The triggering scope allowed in this case should be compatible with occupation of the seat by a child seat and therefore can correspond to the scope of triggering allowed for this seat occupation status. Since a defect is present that has been recognized by triggering control device 3, a corresponding warning signal 3.5 can be provided for the driver to alert him that a defect is present and that the restraint device is offering only minimum protection, if any. The warning can take the form of the second warning light 9.2 glowing intermittently. This indicates firstly a reduced triggering scope and secondly a defect.

Alternatively, in the defective state just discussed, it is also possible to permit instead of a reduced triggering scope, an unlimited triggering of the restraint device in order to guarantee that a passenger who might be occupying the seat is given full protection. This choice however would not be correct if the seat were occupied by a child seat.

Further embodiments especially as regards the implementation of signal interface 6 and seat installation detection device 8 are possible. The use of transponder technology offers advantages, for example, as in German Patent Document DE 44 09 971 C2 described at the outset and used for child seat recognition. Thus signal interface 6 can be formed by an inductor transmission line for wireless transmission of seat occupation status signals 3.1, and seat occupation detection device 4, 5 in the seat itself can be powered by transponder technology and interrogated. Interface interrogation 7 can then take place in such fashion that a check is conducted to determine the existence of a data dialogue. This design of signal interface 6 has the advantage that the signal path is automatically closed when the seat has been properly installed, so that improper handling by an operator does not necessarily have to take place. However this does not offer the advantages provided by the redundant path formed by seat installation detection device 8, since even with transponder technology, sources of error, especially due to the increased electronic technical expense, cannot be ruled out.

In combination therewith or independently thereof, a transponder technology can also be employed in seat installation detection 8, for example with permanent magnet 8.1 being replaced by a transponder and lead switch 8.2 being replaced by a transponder with an antenna. This would have the advantage that improper operation of the switch during transportation of devices with strong magnetic fields such as loudspeakers would be ruled out.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Safety device for a vehicle with a removable seat, comprising:

an occupant restraint device associated with said seat, said occupant restraint device comprising at least one airbag and being triggerable in the event of a serious accident by a triggerable signal from a triggering control device so that the restraint device assumes a restraint position that protects the occupant;

a seat occupation device located in the seat that detects a variable seat occupation status and delivers a corresponding seat occupation status signal through a signal interface to the triggering control device located in the vehicle, which takes the seat occupation status into account in issuing the triggering signal;

a seat installation detection device that detects proper installation of the seat and delivers a corresponding seat installation status signal;

an interface interrogation unit that checks the transmission capability of at least a signal interface and delivers a corresponding interface status signal;

wherein the triggering control device is configured to take into account the status signals for seat occupation, interface, and seat installation in such fashion that the scope of the triggering of the restraint device is adapted to the conditions characterized by the status signals.

2. Safety device for a vehicle with a removable seat according to claim 1, wherein the restraint device is triggerable to a degree that corresponds to the current seat occupation status signal when the seat installation status signal indicates proper installation while the interface status signal indicates that the signal interface is capable of transmission.

3. Safety device for a vehicle with a removable seat according to claim 1, wherein triggering of the restraint device is completely suppressed when the seat installation status signal indicates an incorrect installation while the interface status signal indicates that the signal interface cannot transmit.

4. Safety device for a vehicle with a removable seat according to claim 1, wherein the restraint device becomes triggerable as a function of applied seat occupation status signal when the seat installation status signal indicates an incorrect installation while the interface status signal indicates that the signal interface is capable of transmission.

5. Safety device for a vehicle with a removable seat according to claim 4, wherein a warning signal is emitted to alert the driver to a defect when the seat installation status signal indicates an incorrect installation while the interface status signal indicates that the signal interface is capable of transmission.

6. Safety device for a vehicle with a removable seat according to claim 5, wherein the seat installation detection device is formed by a transponder line.

7. Safety device for a vehicle with a removable seat according to claim 5, wherein a warning device with at least one warning light is provided, said light being connected in such fashion that it does not glow during normal error-free operation and changes to a continuous glow when triggered by the warning signal by which the driver is alerted to a defect.

8. Safety device for a vehicle with a removable seat according to claim 7, wherein the warning device is provided with a second warning light which, when the seat is properly by installed and the signal interface is capable of transmission, by glowing continuously indicates a reduced triggering scope caused by the seat being occupied by a child seat.

9. Safety device for a vehicle with a removable seat according to claim 8, wherein that warning device is controllable by the warning signal in such fashion that when the restraint device, with the seat installed correctly but the interface being incapable of transmission, offers minimum protection that corresponds to occupation of the seat by a child seat, the warning light glows intermittently.

10. Safety device for a vehicle with a removable seat according to claim 1, wherein the restraint device is triggerable partially or not at all when the seat installation status signal indicates a proper installation while the interface status signal indicates that the signal interface cannot transmit.

11. Safety device for a vehicle with a removable seat according to claim 10, wherein when the seat installation status signal indicates a correct installation while the interface status signal indicates that the signal interface cannot transmit, a warning signal is emitted to alert the driver that a defect is present and that the restraint device is offering at most a minimum degree of protection that is compatible with occupation of the seat by a child seat.

12. Safety device for a vehicle with a removable seat according to claim 11, wherein a warning device is controllable by the warning signal in such fashion that when the restraint device, with the seat installed correctly but the interface being incapable of transmission, offers minimum protection that corresponds to occupation of the seat by a child seat, a warning light glows intermittently.

13. Safety device for a vehicle with a movable seat according to claim 10, wherein the partial triggering corresponds to the scope of the triggering with a seat occupation status that indicates occupation by a child seat.

14. Safety device for a vehicle according to claim 13, wherein when the seat installation status signal indicates a correct installation while the interface status signal indicates that the signal interface cannot transmit, a warning signal is emitted to alert the driver that a defect is present and that the restraint device is offering at most a minimum degree of protection that is compatible with occupation of the seat by a child seat.

15. Safety device for a vehicle with a removable seat according to claim 1, wherein when the seat installation status signal indicates a correct installation while the interface status signal indicates that the signal interface cannot transmit, the restraint device is triggerable to an extent that corresponds to occupation of the seat by a person.

16. Safety device for a vehicle with a removable seat according to claim 1, wherein the signal interface is formed by an electrical plug-in connection.

17. Safety device for a vehicle with removable seat according to claim 1, wherein the signal interface is formed by a wireless line.

18. Safety device for a vehicle with a removable seat according to claim 17, wherein the wireless line is an inductive transmission line.

19. Safety device for a vehicle with removable seat according to claim 1, wherein seat installation detection device is formed by an end position switch that is actuated and switched when, as the seat is installed the latter or a seat-locking part reaches a prescribed end position.

20. Safety device for a vehicle with a removable seat according to claim 19, wherein the end position switch is a reed switch.

21. Safety device for a vehicle with a removable seat according to claim 1, wherein the seat is a passenger seat.

22. Safety device for a vehicle with a removable seat according to claim 1, wherein the seat occupation device detects occupation by a person or a child seat.

23. Safety device for a vehicle with a removable seat according to claim 1, wherein the triggering control device takes the seat occupation status into account in order to determine the scope of triggering of the restraint device.

* * * * *